(12) United States Patent
Vitaloni

(10) Patent No.: US 6,550,912 B2
(45) Date of Patent: Apr. 22, 2003

(54) SPECTACLES WITH ADDITIONAL REMOVABLE LENS OR LENSES

(75) Inventor: Alberto Vitaloni, Turin (IT)

(73) Assignee: Nico S.r.L., Turin (IT)

( * ) Notice: Subject to any disclaimer, the term of this patent is extended or adjusted under 35 U.S.C. 154(b) by 0 days.

(21) Appl. No.: 10/137,221

(22) Filed: Apr. 30, 2002

(65) Prior Publication Data

US 2002/0163617 A1 Nov. 7, 2002

(30) Foreign Application Priority Data

May 3, 2001 (IT) .......................................... 2001A0413

(51) Int. Cl.[7] ................................................ G02C 9/00
(52) U.S. Cl. .............................. 351/47; 351/57; 351/86
(58) Field of Search ............................... 351/86, 83, 90, 351/96, 103, 106, 41, 124, 126, 111, 140, 110, 47, 57

(56) References Cited

U.S. PATENT DOCUMENTS

| | | | | | |
|---|---|---|---|---|---|
| 5,387,949 A | * | 2/1995 | Tackles | ....................... | 351/110 |
| 5,971,536 A | * | 10/1999 | Chiu | ........................... | 351/124 |
| 6,086,199 A | * | 7/2000 | Holland et al. | ................ | 351/86 |

\* cited by examiner

Primary Examiner—Hung Xuan Dang
(74) Attorney, Agent, or Firm—Radar, Fishman & Grauer PLLC

(57) ABSTRACT

Spectacles with replaceable lenses comprises a frame constituted by a pair of rims joined together by a central portion or bridge, two temples connected to said frame by connecting members and hinges; means for clasping interchangeable lenses provided at the central portion of said spectacles frame and at said connecting members, each of said clasping means comprising a seat in said central portion adapted for receiving and engaging a first portion of an interchangeable lens and a pliers-shaped device in said connecting members for nipping a second portion of said interchangeable lens.

15 Claims, 5 Drawing Sheets

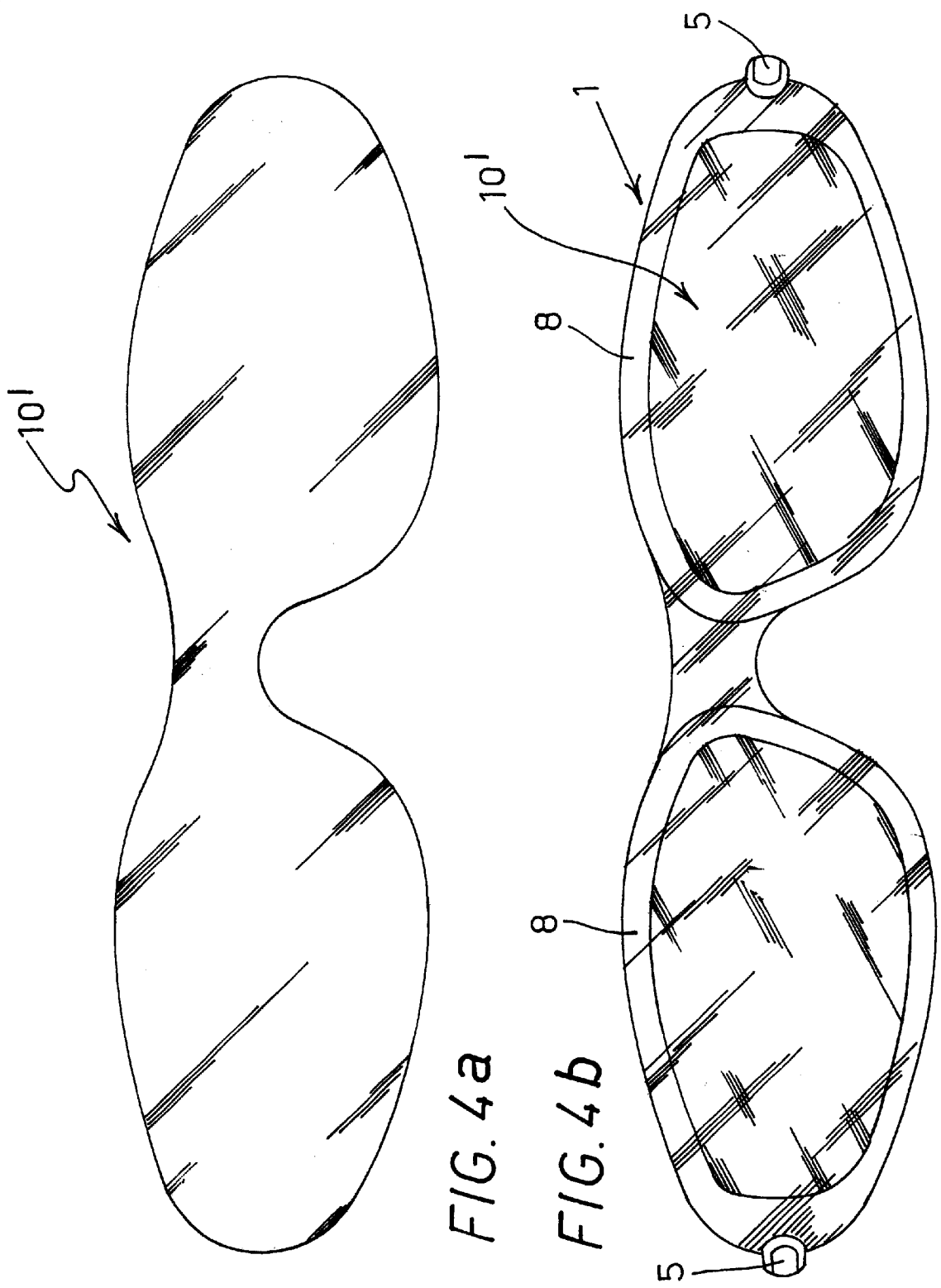

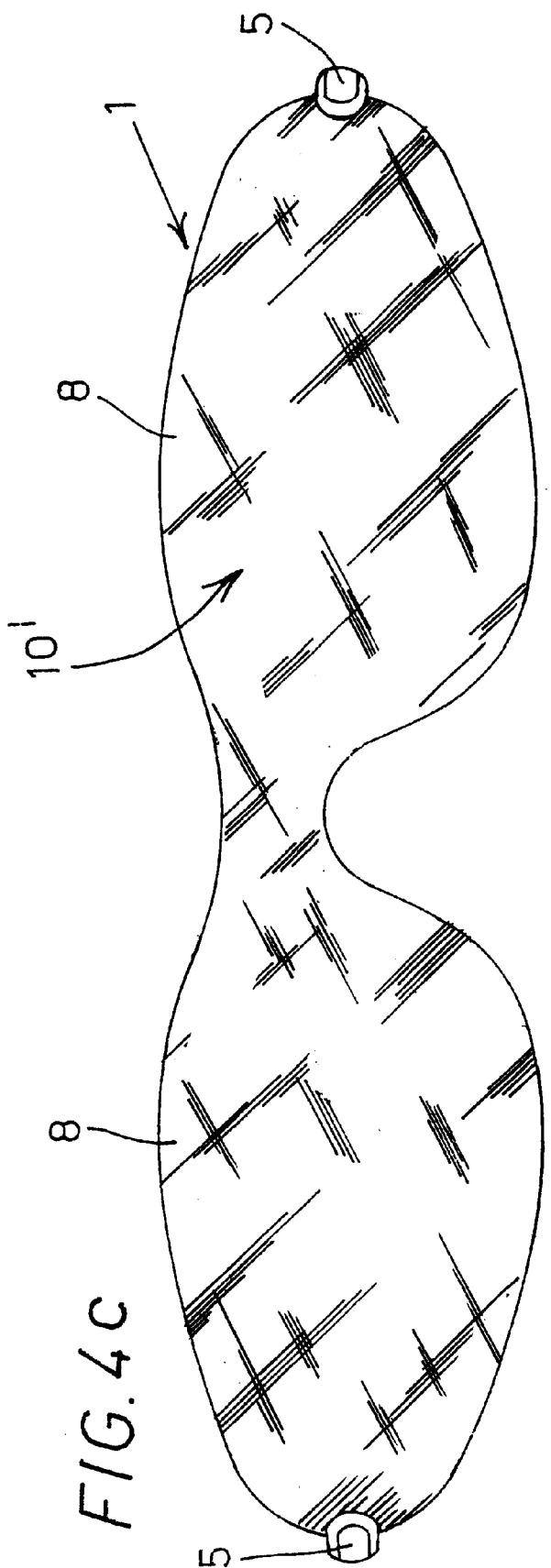

SPECTACLES WITH ADDITIONAL REMOVABLE LENS OR LENSES

BACKGROUND OF THE INVENTION

The present invention relates to spectacles accomodating interchangeable lenses.

As it is known spectacles can accomplish one or more functions such as a therapeutic, ophthalmic, protective or esthetical function.

In all these situations the user may need to adjust his/her spectacles to the specific visual demands of a given moment.

For example, when using sunglasses in highly reflecting environments, it is preferable to wear spectacles provided with strongly absorbing filters, whereas sunglasses with weakly absorbing filters are preferable in low reflecting environments.

On the other hand the user of the spectacles might simply choose to fit sun rays filtering lenses over the fixed<lenses— either graduated or neutral—of the spectacles he/she usually wears.

Therefore should the user bring along as many spectacles as are his/her different demands of protection in the whole day, such user would need a large number of spectacles which would be not only uncomfortable from a practical point of view but also quite expensive since each pair of spectacles would require a different frame.

A known type of spectacles with lenses interchangeable provides a frame to which the lenses can be applied or removed from by means of screws or similar fastening means, but this solution results in being unpractical for a user without experience or not provided with suitable tools.

Other known types of spectacles with lenses interchangeable provide a flexible frame for applying to or removing from the lenses by slightly deforming the whole structure. A drawbacks of these spectacles is that a lens can easily come out of its seat because of an accidental deformation of the frame.

SUMMARY OF THE INVENTION

It is therefore an object of the present invention to provide spectacles in which the lenses may be replaced, with means that allows to adjust the spectacles to the various user's demands in a quick, simple and intuitive way and without the need of using tools.

The above and other objects are accomplished through the spectacles as recited in the attached claims.

Advantageously, an interchangeable lens to be fitted to the spectacles of the present invention is shaped in such a way to be safely and firmly accomodated in seats provided to this aim.

Advantageously the invention provides for retaining the interchangeable lens thanks to clasping means comprising seats engaging a first portion of the lens and pliers-shaped devices nipping a second portion of the same lens. Preferably the seats are located in correspondence of the bridge and the pliers-shaped device are located on the connecting members, or viceversa.

According to the invention, the user wishing to adjust the spectacles to the several possible visual demands is no longer forced to bring along a plurality of spectacles but only a set of suitable lenses that can be sold either together with the spectacles of the invention or as separate accessories.

The invention will now be disclosed in details with particular reference to the attached drawings, illustrating a non-limiting embodiment thereof.

BRIEF DESCRIPTION OF THE DRAWINGS

In the drawings:

FIG. 4a is a front view of an interchangeable lens for spectacles according to a second embodiment of the invention;

FIG. 4b is a front view of the second embodiment of spectacles according to the invention;

FIG. 4c is a front view of a third embodiment of spectacles according to the invention.

DETAILED DESCRIPTION OF PREFERRED EMBODIMENTS

Figure 1:
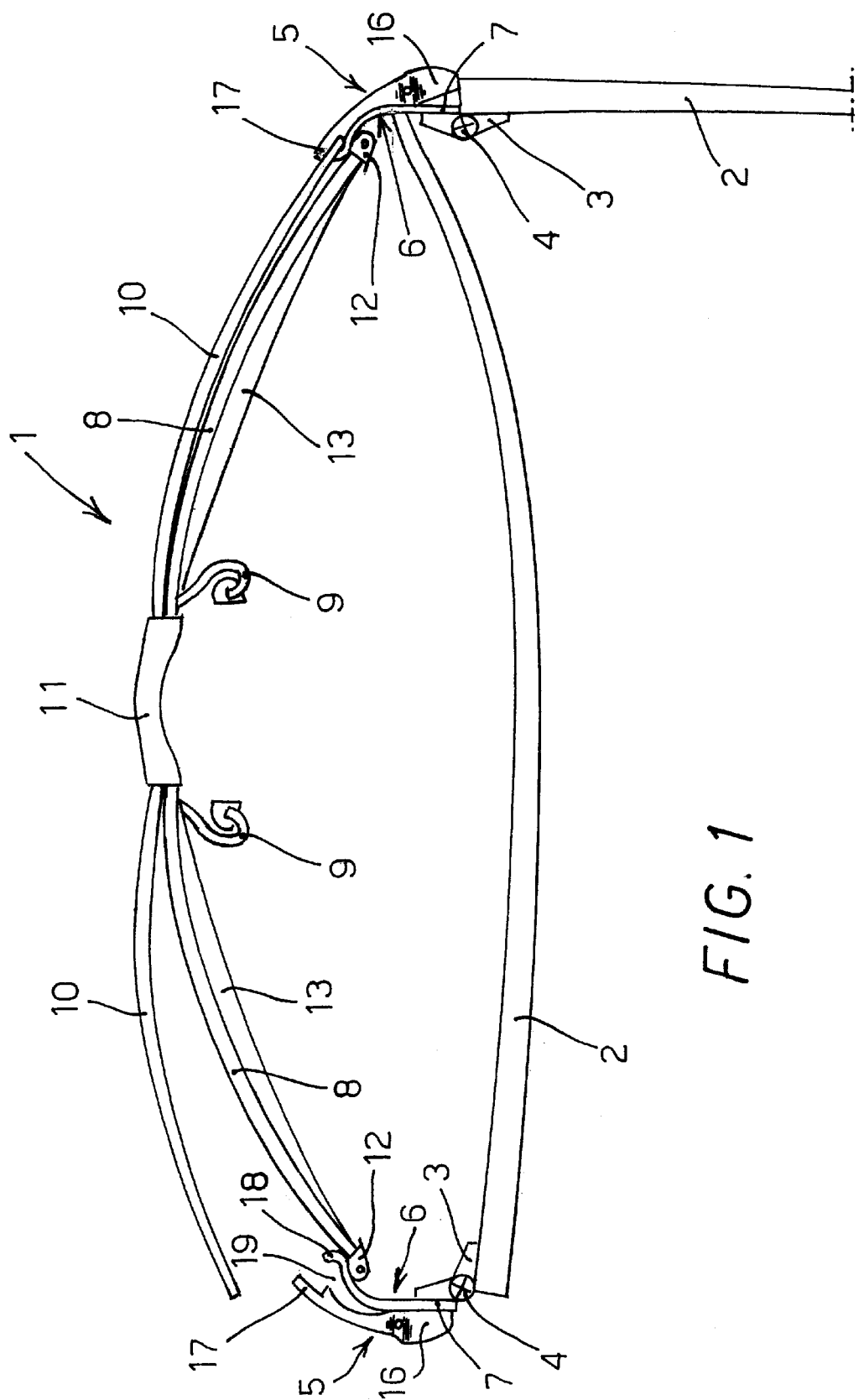
FIG. 1 is a top view of a pair of spectacles according to the invention.

With reference to FIG. 1, a pair of spectacles according to the invention include a frame 1 formed by a pair of rims 8 joined together by a central portion 11 also called bridge, and connected to two temples 2 by connecting members 5,6 and hinges 3,4.

The portions of the rims 8 near the bridge 11 are further provided with projections 9, either fixed or removable, for resting upon the upper and side parts of the user's nose when the spectacles are in place.

The two rims 8 act as holders for the fixed lenses 13, if any, that are fastened to the rims 8 in accordance with known techniques, and also act as supporting frames for the interchangeable lenses 10.

In this respect it is pointed out that in accordance with the present invention, the fixed lenses 13 might also be missing.

Figure 2A:
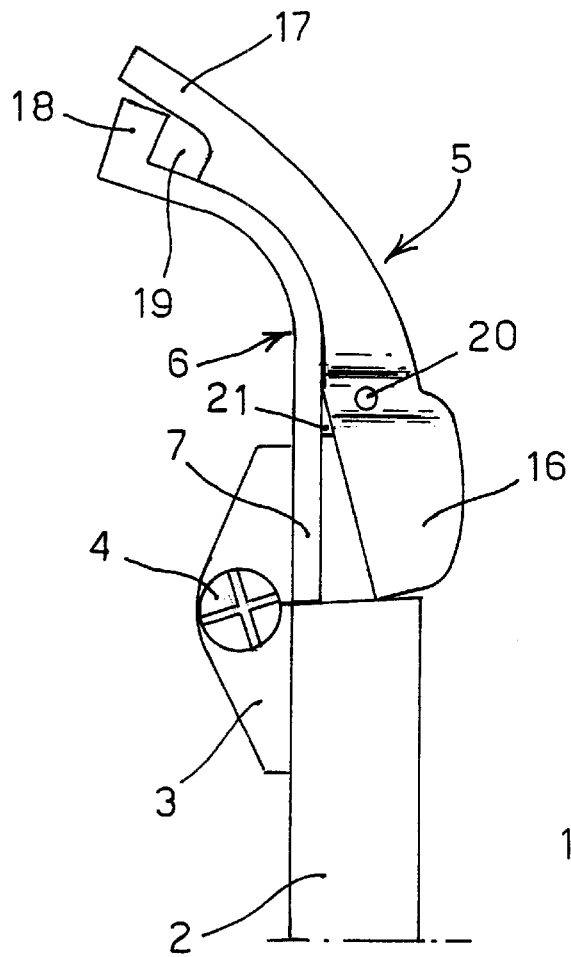
FIGS. 2a and 2b are side views of the clasping means in a closed position and in an open position, respectively.
Figure 2B:
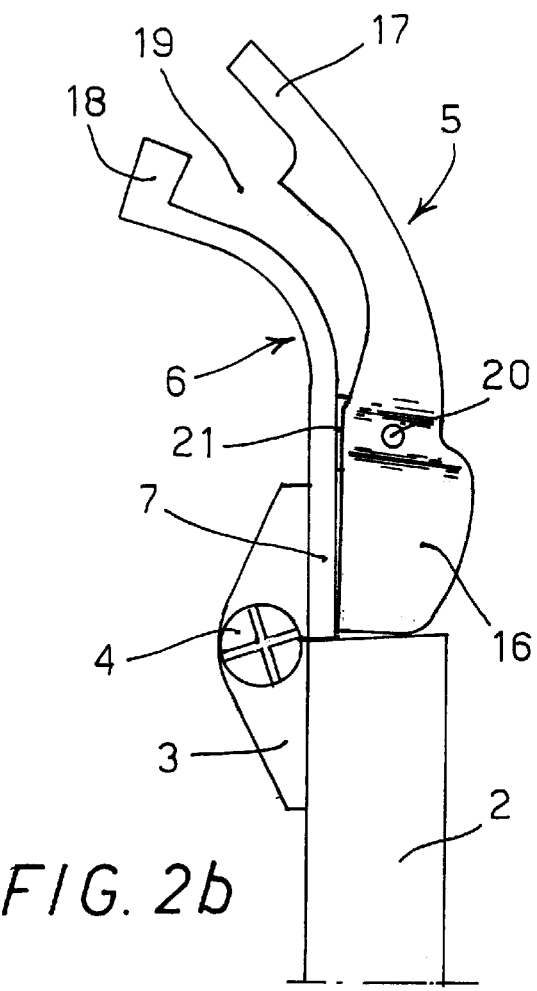

As better shown in FIGS. 2a and 2b, the connecting members 5,6 comprises a fixed curved arm 6 and a movable curved arm 5 hinged to the former.

The movable arm 5 is pivotally connected at 20 to a radial projection 21 of the fixed arm 6.

Each fixed curved arm 6 is connected to a corresponding rim 8 through a rim tightening device 12 incorporating a screw. The end 18 of the arm 6 facing the rim is further bent outwardly of the frame 1 at about 90° and together with the adjacent end 17 of the movable curved arm 5 defines a space or seat 19 for accomodating a portion of the interchangeable lens 10 which is then nipped or clasped between the movable arm 5 and the fixed one 6 acting as the jaws of a pliers.

The temples 2 are pivotally connected or hinged to that portion 7 of the fixed curved arm 6 that is opposite to the bent end 18, through hinges 3 provided with screws 4 so as to maintain the temples 2 either in a folded position—as shown by the left temple in FIG. 1—or in an extended position—as shown by the right temple in FIG. 1.

The end 16 of the movable arm 5 which is opposite to the arm end 17 is bulging out to define a surface on which the user can press his/her finger to rotate the mobile arm against the force of a (not shown) spring member such as a spring, that keeps the end 17 of the movable arm 5 firmly pressed against the lens 10.

Figure 3A:
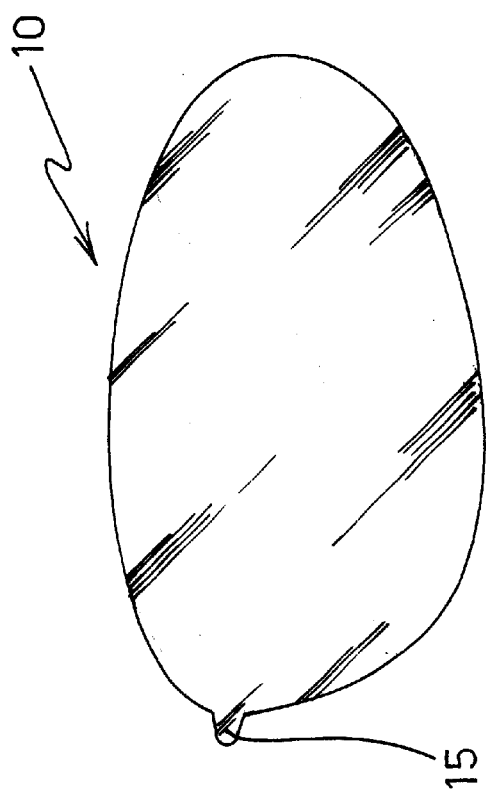
FIG. 3a is a front view of an interchangeable lens for spectacles according to a first embodiment of the invention.
Figure 3B:
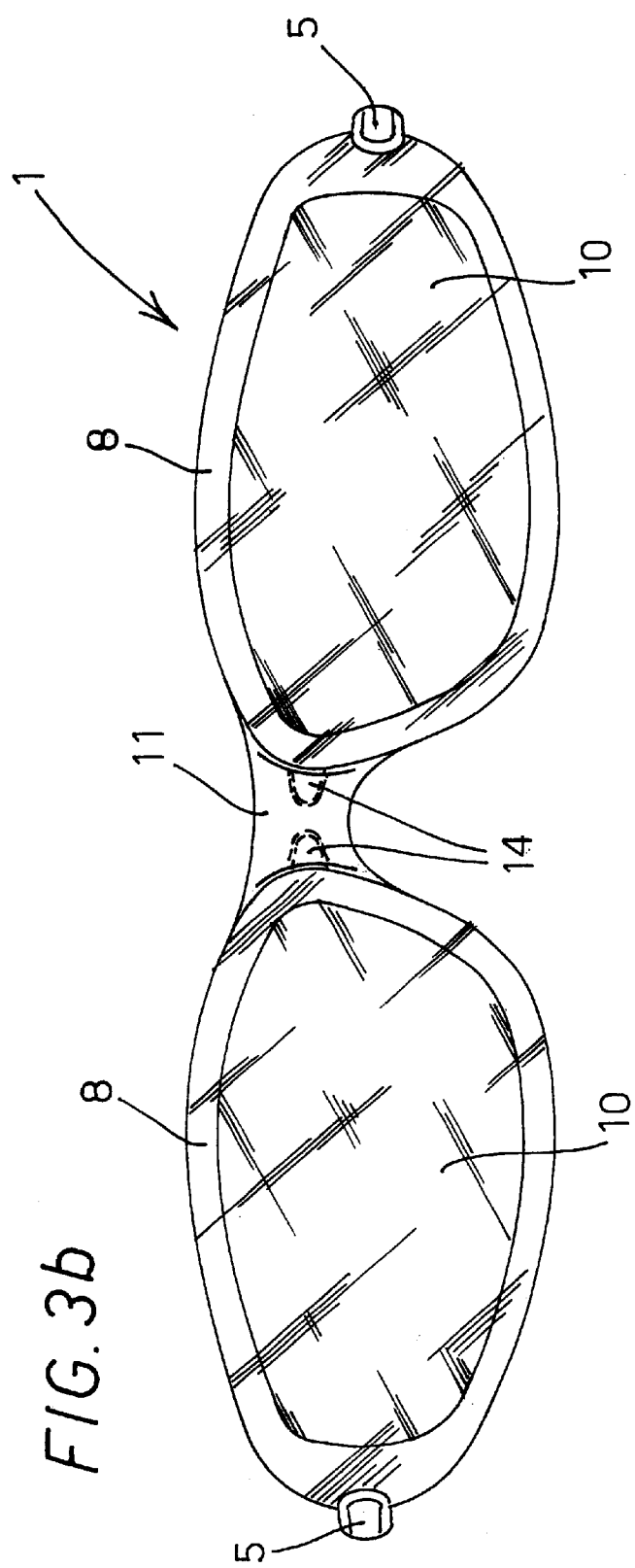
FIG. 3b is a front view of spectacles according to a first embodiment of the invention.

As shown in FIGS. 3a and 3b, in order to retain the interchangeable lens 10 within the spectacles frame 1, the lens 10 is suitably shaped so as to provide a convex projection or tooth 15 being received in and engaged by a complementary (concave) seat 14 formed in the bridge 11 of the frame 1.

It is to be noted that a different embodiment the lens can be equipped with a concave recess (not shown in the Figures) and in such a case the seat 14 is formed with a complementary convex profile, or the lens 10 can be without projections or teeth and in such a case the seat 14 becomes a simply slot.

To fit the lens 10 onto the spectacles frame 1, the projection 15 is inserted into the seat 14, keeping it slightly tilted and then a slight pressure is applied onto the movable arm 5 so that the corresponding portion of the lens 10 can be received in the seat 19 and is nipped between the movable arm 5 and the fixed arm 6.

This way, after the pressure on the bulged portion 16 has been released, the interchangeable lens 10 is firmly retained in the seat 14 on the one hand and in the seat 19 on the other hand, any possible movement being prevented.

Preferably the seat 14 and the lens clasping means 10 are respectively located in correspondence of the bridge 11 and of connecting members 5,6 or viceversa. In accordance with this latter embodiment (not illustrated in the drawings), the clasping means comprises a seat 14 in each connecting members 5,6 adapted for receiving a first portion of an interchangeable lens and a pliers-shaped device is provided in said central portion 11 for nipping a second portion of the lens.

When the user wishes to remove the lens 10 from the spectacles, the above operations are repeated in the reverse order of that described for the insertion.

With reference to FIGS. 4a, 4b and 4c a second and a third embodiment of the spectacles according to the invention are disclosed hereinbelow.

As shown in FIG. 4a the interchangeable lenses for both rims are formed as a one-piece interchangeable lens 10', i.e. formed as a single body so shaped as to cover both rims of the spectacles frame 1. This single lens can be superimposed to the spectacles and fastened thereto—as disclosed above—by clasping their opposed ends with the nipping means 5,6 in the connecting members 5,6 , thus obtaining the configuration shown in FIG. 4b. In this embodiment the single interchangeable lens 10 is not centrally clamped in correspondence of the bridge 11.

On the other hand FIG. 4c illustrates a spectacles embodiment of the type commercially known as "mask" or three-piece spectacles, in which the bridge and the temples are fastened directly to the lenses without using rims. In this embodiment there is provided a single interchangeable lens 10' adapted to completely cover the frame 1 as well as the fixed lenses, if present. Also in this case the interchangeable lens 10' is secured to the spectacles through the clasping means located at the opposite ends of the spectacles and no central clamping is provided for.

I claim:

1. Spectacles with additional removable lenses comprising:
   a frame formed by a pair of rims joined together by a central portion, or bridge, and two temples connected to said frame by connecting members and hinges, said frame holding at least one fixed lens;
   means for clasping a pair of additional interchangeable lenses provided at said central portion of said spectacles frame and at said connecting members, each of said clasping means comprising a seat in said central portion adapted for receiving and engaging a first portion of an additional interchangeable lens and a pliers-shaped device in said connecting members for nipping a second portion of said additional interchangeable lens, whereby said pair of additional interchangeable lenses are superimposed to said fixed lens or lenses.

2. The spectacles according to claim 1, wherein said fixed lens or lenses is/are ophthalmic lens or lenses and said additional interchangeable lens or lenses is/are sunglasses lens or lenses.

3. Spectacles with additional removable lenses comprising:
   a frame formed by a pair of rims joined together by a central portion, or bridge, and two temples connected to said frame by connecting members and hinges, said frame holding at least one fixed lens;
   means for clasping a pair of additional interchangeable lenses provided at said central portion of said spectacles frame and at said connecting members, each of said clasping means comprising a seat in said connecting members adapted for receiving and engaging a first portion of an additional interchangeable lens and a pliers-shaped device in said central portion for nipping a second portion of said additional interchangeable lens, whereby said pair of additional interchangeable lenses are superimposed to said fixed lens or lenses.

4. The spectacles according to claim 1 or 3, wherein said additional interchangeable lens provides a projection or tooth for engaging said seat.

5. The spectacles according to claim 1 or 3, wherein said seat comprises a slot for receiving a portion of said additional interchangeable lens.

6. The spectacles according to claim 1 or 3, wherein at said central portion there are further provided projections, either fixed or removable, for resting upon the upper and side parts of the user's nose when the spectacles are in place.

7. The spectacles according to claim 3, wherein said fixed lens or lenses is/are ophthalmic lens or lenses and said additional interchangeable lens or lenses is/are sunglasses lens or lenses.

8. Spectacles with additional removable lens comprising:
   a lens holding frame with temples connected to said frame by connecting members, said frame holding at least one fixed lens;
   means for clasping a one-piece additional interchangeable lens provided at both of said connecting members, each of said clasping means comprising a pliers-shaped device for nipping a side portion of said additional interchangeable lens, whereby said additional interchangeable lens is superimposed to said fixed lens or lenses.

9. The spectacles according to claim 1 or 3 or 8, wherein said pliers-shaped device comprises a fixed curved arm and a movable curved arm hinged to the former, one end of said fixed curved arm being connected to said frame and the opposite end of said fixed curved arm being connected to one of the temples.

10. The spectacles according to claim 9, wherein the end of said fixed curved arm connected to said frame is bent outwardly of the frame and together with the adjacent end of the movable curved arm defines a space for accommodating a portion of said additional interchangeable lens which is then nipped between said movable arm and said fixed arm.

11. The spectacles according to claim 8, wherein said fixed lens or lenses is/are ophthalmic lens or lenses and said additional interchangeable lens or lenses is/are sunglasses lens or lenses.

12. Spectacles with an additional removable lens comprising:

a first lens with temples fixedly connected to said lens by connecting members; means for clasping a one-piece additional interchangeable lens provided at both of said connecting members, each of said clasping means comprising a pliers-shaped device for nipping a side portion of said additional interchangeable lens, whereby said additional interchangeable lens is superimposed to said first lens.

13. The spectacles according to claim 12, wherein said pliers-shaped device comprises a fixed curved arm and a movable curved arm hinged to the former, one end of said fixed curved arm being connected to said first lens and the opposite end of said fixed curved arm being connected to one of the temples.

14. The spectacles according to claim 13, wherein the end of said fixed curved arm connected to said first lens is bent outwardly of the frame and together with the adjacent end of the movable curved arm defines a space for accommodating a portion of said additional interchangeable lens which is then nipped between said movable arm and said fixed arm.

15. The spectacles according to claim 12, wherein said fixed lens or lenses is/are ophthalmic lens or lenses and said additional interchangeable lens or lenses is/are sunglasses lens or lenses.

* * * * *